(12) United States Patent
Curtis et al.

(10) Patent No.: US 7,495,689 B2
(45) Date of Patent: Feb. 24, 2009

(54) MULTIPLE SIMULTANEOUS LANGUAGE DISPLAY SYSTEM AND METHOD

(75) Inventors: Joseph Curtis, Harriman, NY (US); Jeffrey Jacobs, Chestnut Ridge, NY (US); Jiansong Lei, Edgewater, NJ (US)

(73) Assignee: Pelco, Inc., Clovis, CA (US)

( * ) Notice: Subject to any disclaimer, the term of this patent is extended or adjusted under 35 U.S.C. 154(b) by 1399 days.

(21) Appl. No.: 10/341,566

(22) Filed: Jan. 13, 2003

(65) Prior Publication Data

US 2003/0133041 A1   Jul. 17, 2003

Related U.S. Application Data

(60) Provisional application No. 60/348,913, filed on Jan. 15, 2002.

(51) Int. Cl.
  *H04N 5/225* (2006.01)
  *G06F 17/28* (2006.01)
  *G06F 17/20* (2006.01)
(52) U.S. Cl. .............................. 348/207.1; 702/2; 702/8
(58) Field of Classification Search ...................... 704/2, 704/8; 348/207.1
  See application file for complete search history.

(56) References Cited

U.S. PATENT DOCUMENTS

| 6,559,866 B2 * | 5/2003 | Kolde et al. ................. 715/765 |
| 7,116,357 B1 * | 10/2006 | Oya et al. ................. 348/211.8 |
| 7,185,289 B1 * | 2/2007 | Taima ......................... 715/810 |

* cited by examiner

*Primary Examiner*—David L Ometz
*Assistant Examiner*—Dillon Durnford-Geszvain
(74) *Attorney, Agent, or Firm*—Paul T. Kashimba, Esq.

(57) ABSTRACT

A system and method which provides simultaneous display of characters on one or more display monitors in multiple languages. The languages can include icon based languages such as Chinese and Japanese or can be traditional character based languages such as romance and Germanic languages. The system includes a main unit having a first memory in which the first memory includes character data stored in a plurality of languages. A portion of the character data in a first language corresponds to another portion of the character data in a second language, the portion of the character data in the first language and the portion of the character data in the second language are stored in the first memory at memory locations having an offset value from each other.

36 Claims, 6 Drawing Sheets

FIG. 6

|   | MONITOR 08 |
|---|---|
| CAMERA NUMBER: | ON |
| CAMERA TITLE: | ON |
| R/X TYPE: | ON |
| MON/ALM NUMBER: | ON |
| MON/ALM STATUS: | ON |
| TIME: | ON |
| DATE: | ON |
| BRIGHTNESS: | 8 |

LANGUAGE SELECTION

POSITION DISPLAY

SET ALL

RETURN

FIG. 7

MONITOR 08

LANGUAGE SELECTION

| MENU LANGUAGE: | ENGLISH |
|---|---|

CAMERA TITLE LANGUAGES

| ENGLISH: | ON |
|---|---|
| SPANISH: | ON |
| ITALIAN: | OFF |
| PORTUGUESE: | OFF |
| GERMAN: | OFF |
| FRENCH: | OFF |

RETURN

FIG. 8

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|---|---|---|---|---|---|---|---|---|---|----|----|----|----|----|----|----|----|----|----|----|----|----|----|----|----|----|----|----|----|----|----|
| 0  |   |   |   |   |   |   |   |   |   |   |    |    |    |    |    |    |    |    |    |    |    |    |    |    |    |    |    |    |    |    |    |    |
| 1  |   |   |   |   |   |   |   |   |   |   |    |    |    |    |    |    |    |    |    |    |    |    |    |    |    |    |    |    |    |    |    |    |
| 2  |   |   |   |   |   |   |   |   |   |   |    |    |    |    |    |    |    |    |    |    |    |    |    |    |    |    |    |    |    |    |    |    |
| 3  |   |   |   |   |   |   |   |   |   |   |    | C  | A  | M  | E  | R  | A  |    | 1  | 6  |    |    |    |    |    |    |    |    |    |    |    |    |
| 4  |   |   |   |   |   |   |   |   |   |   |    |    |    |    |    |    |    |    |    |    |    |    |    |    |    |    |    |    |    |    |    |    |
| 5  |   |   |   |   |   |   |   |   |   |   |    |    |    |    |    |    |    |    |    |    |    |    |    |    |    |    |    |    |    |    |    |    |
| 6  |   |   |   | V | E | R | T | I | C | A | L  |    | D  | R  | I  | V  | E  | :  |    |    | O  | F  | F  |    |    |    |    |    |    |    |    |    |
| 7  |   |   |   | C | O | N | T | R | O | L | :  |    |    |    |    |    |    |    |    |    | E  | X  | T  |    | C  | O  | A  | X  |    |    |    |    |
| 8  |   |   |   | P | O | R | T |   | A | D | D  | R  | E  | S  | S  | :  |    |    |    |    | 0  | 1  |    |    |    |    |    |    |    |    |    |    |
| 9  |   |   |   |   |   |   |   |   |   |   |    |    |    |    |    |    |    |    |    |    |    |    |    |    |    |    |    |    |    |    |    |    |
| 10 |   |   |   |   |   |   |   |   |   |   |    | C  | A  | M  | E  | R  | A  |    | T  | I  | T  | L  | E  | S  |    |    |    |    |    |    |    |    |
| 11 |   |   |   | E | N | G | : |   | X | X | X  | X  | X  | X  | X  | X  | X  | X  | X  | X  | X  | X  | X  | X  | X  | X  | X  | X  |    |    |    |    |
| 12 |   |   |   | E | S | P | : |   | Y | Y | Y  | Y  | Y  | Y  | Y  | Y  | Y  | Y  | Y  | Y  | Y  | Y  | Y  | Y  | Y  | Y  | Y  | Y  |    |    |    |    |
| 13 |   |   |   | F | R | A | : |   | Z | Z | Z  | Z  | Z  | Z  | Z  | Z  | Z  | Z  | Z  | Z  | Z  | Z  | Z  | Z  | Z  | Z  | Z  | Z  |    |    |    |    |
| 14 |   |   |   |   |   |   |   |   |   |   |    |    |    |    |    |    |    |    |    |    |    |    |    |    |    |    |    |    |    |    |    |    |
| 15 |   |   |   |   |   |   |   |   |   |   |    |    |    |    |    |    |    |    |    |    |    |    |    |    |    |    |    |    |    |    |    |    |
| 16 |   |   |   |   |   |   |   |   |   |   |    |    |    |    |    |    |    |    |    |    |    |    |    |    |    |    |    |    |    |    |    |    |
| 17 |   |   |   |   |   |   |   |   |   |   |    |    |    |    |    |    |    |    |    |    |    |    |    |    |    |    |    |    |    |    |    |    |
| 18 |   |   |   |   |   |   |   |   |   |   |    |    |    |    |    |    |    |    |    |    |    |    |    |    |    |    |    |    |    |    |    |    |
| 19 |   |   |   |   |   |   |   |   |   |   |    |    |    |    |    |    |    |    |    |    |    |    |    |    |    |    |    |    |    |    |    |    |
| 20 |   |   |   |   |   |   |   |   |   |   |    |    |    |    | R  | E  | T  | U  | R  | N  |    |    |    |    |    |    |    |    |    |    |    |    |
| 21 |   |   |   |   |   |   |   |   |   |   |    |    |    |    |    |    |    |    |    |    |    |    |    |    |    |    |    |    |    |    |    |    |
| 22 |   |   |   |   |   |   |   |   |   |   |    |    |    |    |    |    |    |    |    |    |    |    |    |    |    |    |    |    |    |    |    |    |
| 23 |   |   |   |   |   |   |   |   |   |   |    |    |    |    |    |    |    |    |    |    |    |    |    |    |    |    |    |    |    |    |    |    |
| 24 |   |   |   |   |   |   |   |   |   |   |    |    |    |    |    |    |    |    |    |    |    |    |    |    |    |    |    |    |    |    |    |    |
| 25 |   |   |   |   |   |   |   |   |   |   |    |    |    |    |    |    |    |    |    |    |    |    |    |    |    |    |    |    |    |    |    |    |

FIG. 9

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|---|---|---|---|---|---|---|---|---|---|----|----|----|----|----|----|----|----|----|----|----|----|----|----|----|----|----|----|----|----|----|----|
| 0  |   |   |   |   |   |   |   |   |   |   |    |    |    |    |    |    |    |    |    |    |    |    |    |    |    |    |    |    |    |    |    |    |
| 1  |   |   |   |   |   |   |   |   |   |   |    |    |    |    |    |    |    |    |    |    |    |    |    |    |    |    |    |    |    |    |    |    |
| 2  |   |   |   |   |   |   |   |   |   |   |    |    |    |    |    |    |    |    |    |    |    |    |    |    |    |    |    |    |    |    |    |    |
| 3  |   |   |   |   |   |   |   |   |   |   |    |    |    |    |    |    |    |    |    |    |    |    |    |    |    |    |    |    |    |    |    |    |
| 4  |   |   |   |   |   |   |   |   |   |   |    |    |    |    |    |    |    |    |    |    |    |    |    |    |    |    |    |    |    |    |    |    |
| 5  |   |   |   |   |   |   |   |   |   |   |    |    |    |    |    |    |    |    |    |    |    |    |    |    |    |    |    |    |    |    |    |    |
| 6  |   |   |   |   |   |   |   |   |   |   |    |    |    |    |    |    |    |    |    |    |    |    |    |    |    |    |    |    |    |    |    |    |
| 7  |   |   |   |   |   |   |   |   |   |   |    |    |    |    |    |    |    |    |    |    |    |    |    |    |    |    |    |    |    |    |    |    |
| 8  |   |   |   |   |   |   |   |   |   |   |    |    |    |    |    |    |    |    |    |    |    |    |    |    |    |    |    |    |    |    |    |    |
| 9  |   |   |   |   |   |   |   |   |   |   |    |    |    |    |    |    |    |    |    |    |    |    |    |    |    |    |    |    |    |    |    |    |
| 10 |   |   |   |   |   |   |   |   |   |   |    |    |    |    |    |    |    |    |    |    |    |    |    |    |    |    |    |    |    |    |    |    |
| 11 |   |   |   |   |   |   |   |   |   |   |    |    |    |    |    |    |    |    |    |    |    |    |    |    |    |    |    |    |    |    |    |    |
| 12 |   |   |   |   |   |   |   |   |   |   |    |    |    |    |    |    |    |    |    |    |    |    |    |    |    |    |    |    |    |    |    |    |
| 13 |   |   |   |   |   |   |   |   |   |   |    |    |    |    |    |    |    |    |    |    |    |    |    |    |    |    |    |    |    |    |    |    |
| 14 |   |   |   |   |   |   |   |   |   |   |    |    |    |    |    |    |    |    |    |    |    |    |    |    |    |    |    |    |    |    |    |    |
| 15 |   |   |   |   |   |   |   |   |   |   |    |    |    |    |    |    |    |    |    |    |    |    |    |    |    |    |    |    |    |    |    |    |
| 16 |   |   |   |   |   |   |   |   |   |   |    |    |    |    |    |    |    |    |    |    |    |    |    |    |    |    |    |    |    |    |    |    |
| 17 |   |   |   |   |   |   |   |   |   |   |    |    |    |    |    |    |    |    |    |    |    |    |    |    |    |    |    |    |    |    |    |    |
| 18 |   |   |   |   |   |   |   |   |   |   |    |    |    |    |    |    |    |    |    |    |    |    |    |    |    |    |    |    |    |    |    |    |
| 19 |   |   |   |   |   |   |   |   |   |   |    |    |    |    |    |    |    |    |    |    |    |    |    |    |    |    |    |    |    |    |    |    |
| 20 |   |   |   |   |   |   |   |   |   |   |    |    |    |    |    |    |    |    |    |    |    |    |    |    |    |    |    |    |    |    |    |    |
| 21 |   |   |   |   |   |   |   |   |   |   |    |    |    |    |    |    |    |    |    |    |    |    |    |    |    |    |    |    |    |    |    |    |
| 22 |   |   |   |   |   |   |   | P | U | E | R  | T  | O  |    | 1  |    |    |    |    |    |    |    |    |    |    |    |    |    |    |    |    |    |
| 23 | 0 | 0 | 0 | 1 |   | E |   | D | O | O | R  |    | 1  |    |    |    |    |    |    |    |    |    |    |    |    |    |    |    |    |    |    |    |
| 24 | 0 | 0 | 0 | 1 |   |   |   | 0 | 1 | - | J  | A  | N  | -  | 0  | 1  |    | 0  | 2  | :  | 4  | 5  | :  | 0  | 0  |    |    |    |    |    |    |    |
| 25 |   |   |   |   |   |   |   |   |   |   |    |    |    |    |    |    |    |    |    |    |    |    |    |    |    |    |    |    |    |    |    |    |

MULTIPLE SIMULTANEOUS LANGUAGE DISPLAY SYSTEM AND METHOD

CROSS-REFERENCE TO RELATED APPLICATION

This application is related to and claims priority to U.S. Provisional Patent Application Ser. No. 60/348,913, filed Jan. 15, 2002, MULTIPLE SIMULTANEOUS LANGUAGE DISPLAY SYSTEM AND METHOD, the entirety of which is incorporated herein by reference.

STATEMENT REGARDING FEDERALLY SPONSORED RESEARCH OR DEVELOPMENT n/a

FIELD OF THE INVENTION

The present invention relates to video systems, and, in particular, to a system and method for efficiently generating and displaying video captions in multiple languages on a video surveillance system display.

BACKGROUND OF THE INVENTION

The expanding focus and concern over security has driven the closed circuit television ("CCTV") surveillance industry to continue to expand not only the scale of CCTV surveillance systems, but also the features offered. A typical CCTV surveillance system includes one or more cameras from which video images can be displayed on one or more video monitors. The matching of a video signal from a camera to a monitor is typically accomplished via a video switch device. Conversely, the control of a specific camera through a user's operation of a control panel "keyboard" is routed through the switch device.

Textual information is typically overlaid on the video image and displayed on a monitor to aid configuration of the system, identification of the image origin, location of the camera, etc. The text is stored in non-volatile system memory and used to assemble configuration menus, date/time, location information, and the like. As feature offerings expand so to does the amount of textual information which must be stored in the system's memory. The undesirable result is that additional storage must be provided in the system.

This problem is exacerbated by the need to support multiple languages. In order to support multiple languages, additional memory for storage of text in the multiple languages must be provided. Further, programming the system to accommodate the multiple languages results in increased system complexity and storage requirements because existing systems typically implement redundant code to invoke and allow operation in the various languages.

In addition, systems which use multiple monitors such as are found in complex closed circuit television security systems may employ these monitors at different locations. Large installations may have monitors which are viewed by different persons at different times. The individuals monitoring the system may be deployed at different locations or at the same location. Further, individuals on different shifts may be stronger in one language than another. As such, the individual's ability to understand the text presented on the monitor may be impaired if the individual is forced to view the textual information in a language in which the individual is not fluent. This problem is exacerbated by languages which have an extremely large number of characters such as Chinese, Japanese, etc. due to the need to store display character font data.

It is therefore desirable to have a system which allows multiple languages to be simultaneously displayed on the same or different monitors. It is further desirable to be able to display these different languages by employing efficient programmatic code so that a programmer need not duplicate or customize the programmatic code to accomplish the multiple language display. In other words, it is desirable to have a system and method for generating the multiple simultaneous languages which do not require that a portion of the code be duplicated to support each separate language. As such, it is desirable to have a method and system which minimizes or even avoids the need to duplicate programmatic software code to accommodate the simultaneous display of multiple languages.

SUMMARY OF THE INVENTION

According to one aspect, the present invention provides a system providing simultaneous display of characters in multiple languages in which the system has a main unit having a first memory. The first memory includes character data stored in a plurality of languages in which a portion of the character data in a first language corresponds to another portion of the character data in a second language. The portion of the character data in the first language and the portion of the character data in the second language are stored in the first memory at memory locations having an offset value from each other.

According to another aspect, the present invention provides a closed circuit television video matrix switch providing simultaneous display of characters in multiple languages on one or more monitors electrically coupled thereto in which the switch has a first memory. The first memory includes character data stored in a plurality of languages in which a portion of the character data in a first language corresponds to another portion of the character data in a second language. The portion of the character data in the first language and the portion of the character data in the second language are stored in the first memory at memory locations having an offset value from each other.

According to yet another aspect, the present invention provides a method of providing simultaneous display of characters in multiple languages in which a memory storage location offset value corresponding to a first language and a second language is determined. Character data is stored in a first memory in which a portion of the character data is in the first language and corresponds to another portion of the character data in the second language. The portion of the character data in the first language and the portion of the character data in the second language are stored in the first memory at memory locations based on the offset value.

According to still yet another aspect, the present invention provides a closed circuit television monitoring system for displaying characters overlaid on a base video image in which the displayed characters are in one or more of a plurality of languages. A plurality of displays are provided. Each of at least one camera captures the base video image. A switch is electrically coupled to the plurality of displays and the at least one camera, in which the switch has a first memory, a second memory and a monitor card. The first memory includes character data stored in a plurality of languages in which a portion of the character data in a first language corresponds to another portion of the character data in a second language. The portion of the character data in the first language and the portion of the character data in the second language are stored in the first memory at memory locations having an offset value from each other. The second memory is electrically coupled to the first memory in which the second memory is a random access memory. The second memory includes an overlay build memory area. The overlay build memory area stores character overlay data for a corresponding display in a selected one of the first language and the second language. The monitor card is electrically coupled to the first memory and the second memory. The monitor card includes a third memory arranged to store at least one font bit map and character overlay data copied from the second memory. The monitor card generates a composite video signal for display on one or more selected displays. The composite video signal includes the base video signal and an overlay based on the character overlay data and on a font bit map corresponding to the selected language.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 6 shows a sample monitor display screen used to configure monitor parameters;

FIG. 7 shows a sample monitor display screen used to configure language parameters;

FIG. 8 is an example camera configuration display screen; and

FIG. 9 is an example of a monitor display screen showing Spanish and English text.

DETAILED DESCRIPTION OF THE INVENTION

The present invention advantageously provides a system and method which efficiently supports the display of different languages on the same or multiple displays at the same time. For example, the hardware and software arrangement of the present invention permits a closed circuit television matrix switch such as Pelco's cm6800-48×8 to display multiple languages on separate CCTV monitors simultaneously.

Figure 1:
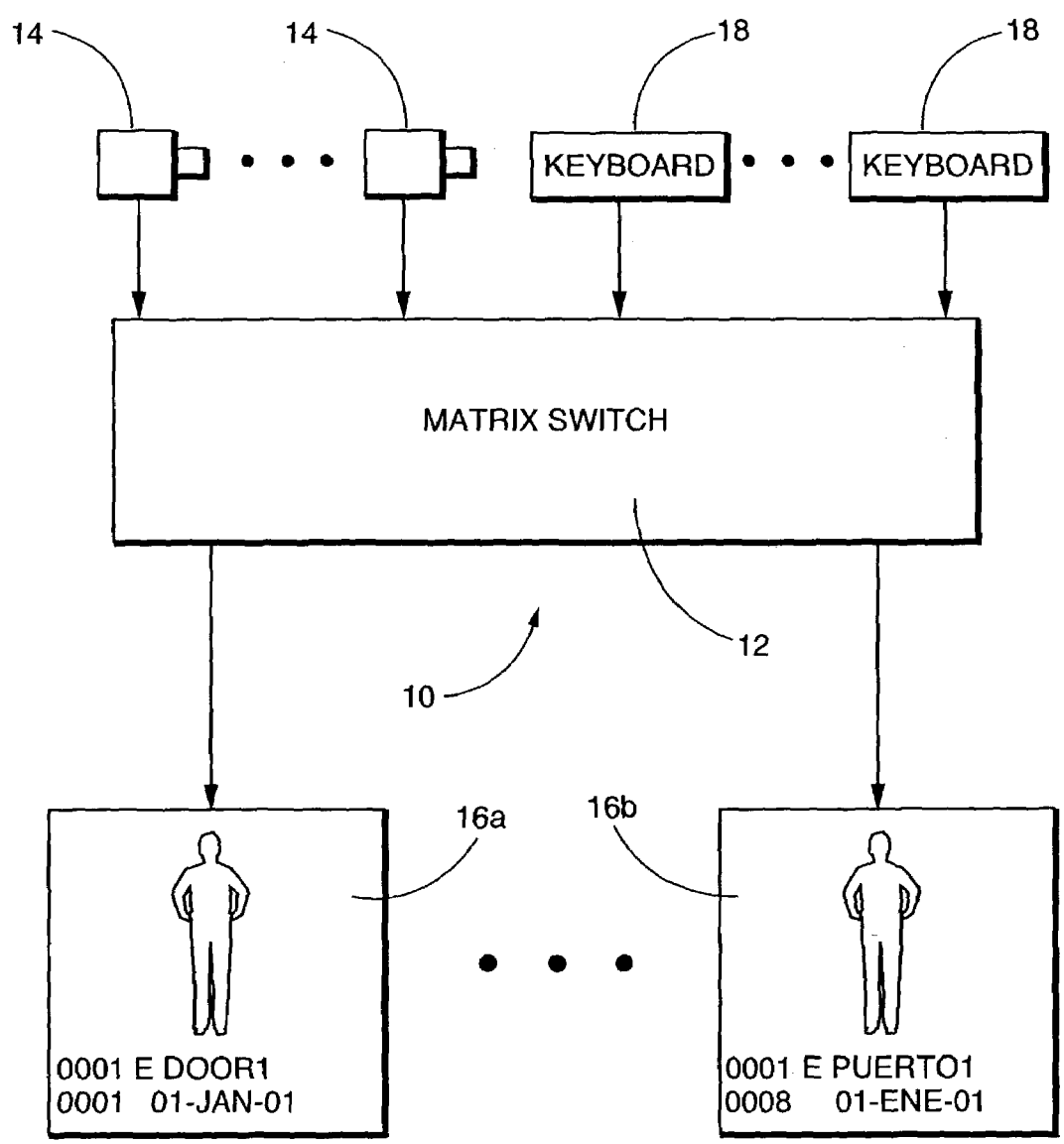
FIG. 1 is a block diagram of a system constructed in accordance with the principles of the present invention.

Referring now to the drawing figures in which like reference designators refer to like elements, there shown in FIG. 1 a block diagram of an exemplary system arrangement which supports the features of the present invention and is designated as 10. System 10 includes matrix switch 12 electrically coupled to one or more cameras 14 and monitors 16a and 16b (collectively referred to herein as monitors 16). System 10 further includes one or more user operable keyboard controllers 18 for inputting control and system customization programming commands. Based on input from keyboard controllers 18, matrix switch 12 is operable to, among other things, couple the video signal from a camera 14 to one or more monitors 16. The selection can be automatic, such as based on the occurrence of an external alarm condition, or manually selected by an operator via a keyboard controller 18. Of note, although keyboard controller 18 is shown in FIG. 1 as directly coupled to switch 12, it is contemplated that the system can be implemented using a separate controller interposed between a keyboard and switch 12 (not shown).

Camera 14 can be any camera suitable for capturing images for use in a security system as are generally known in the art. Similarly, monitor 16 can be any monitor suitable for displaying the images captured by cameras 14 for use in a security system as are generally known in the art.

Matrix switch 12 is adapted to support multiple languages for display on monitors 16. For example, as shown in FIG. 1, monitor 16a is displaying text in English, while monitor 16b is displaying the same text in Spanish. In this case, matrix switch 12 is programmed to couple the video signal from a camera 14, to both of monitors 16a and 16b, the difference between the two resultant video signals being that matrix switch 12 superimposes English language text onto the video signal destined for monitor 16a and superimposes Spanish language text onto the video signal destined for monitor 16b. It is further contemplated that matrix switch 12 can be programmed to support multiple languages on the same display, for example, overlaying both English and Spanish text onto a video signal captured from a camera 14 and displaying the resultant signal on one or more monitors 16.

Figure 2:
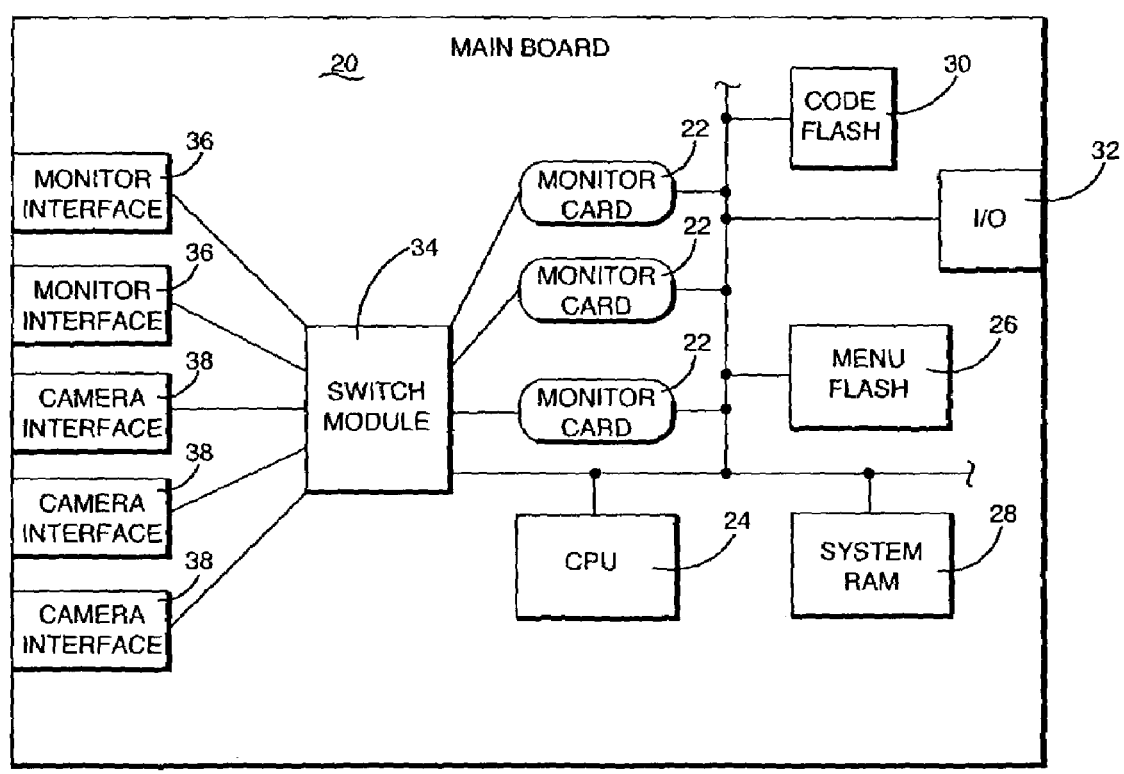
FIG. 2 is a diagram of a matrix switch constructed in accordance with the principles of the present invention.

An exemplary arrangement of a matrix switch 12 constructed in accordance with the principles of the present invention is described with reference to FIG. 2. Matrix switch 12 includes main board 20, also referred to as a motherboard, to which is electrically coupled one or more monitor cards 22, a Central Processing Unit (CPU) 24, menu flash 26 and system RAM 28. Also electrically coupled to main board 20 is code flash 30, input/output (I/O) interface 32, switch module 34, one or more monitor interfaces 36 and one or more camera interfaces 38.

It should be noted that, although main board 20 is described herein as incorporated as part of matrix switch 12, the present invention is not limited to this arrangement. Main board 20 and the functions described herein can be enclosed inside any suitable main unit housing (not shown) and need not be incorporated as part of a larger system such as a closed circuit television matrix switch. In other words, the video switching functionality can be implemented in a separate housing and device from those implanting the language display features described herein. Further, the components and functions described with respect to matrix switch 12 in connection with the present invention are a subset of the functions and components present in matrix switch 12. Other components and functions performed by matrix switch 12 which do not relate to the present invention but which could be implemented by one of ordinary skill, such as the basic camera to monitor switching performed by switch module 34, are not described herein. Although the present invention is described using a single main board 20 which has one or more monitor cards 22 associated therewith, it is contemplated that a distributed system can be provided such that monitors are disbursed across a wide geographic region using known communication protocols and known methods for communicating a video image across a long distance.

Main board 20 includes the electronic circuitry needed to allow monitor cards 22, CPU 24, menu flash 26, system RAM 28, code flash 30, I/O 32, switch module 34 and interfaces 36 and 38 to electrically communicate with each other, as may be needed. It is presumed that one of ordinary skill in the art could arrange suitable communication electronics among the various components on main board 10.

I/O module 32 includes the hardware necessary to facilitate data communication with externally connected devices other than monitors and cameras, such as keyboard controllers 18. In operation, keyboard controller 18 is electrically coupled to I/O module 32 using a suitable cable and/or connector. Although FIG. 2 shows a single I/O module 32, it is understood that more than one I/O module 32 can be included based on the size and scale of system 10 and the quantity of peripheral devices to be supported. It is further contemplated that one of ordinary skill in the art could design I/O module 32 to facilitate data communication between keyboard controller 18 and mainboard 20 using known electrical and/or logical interface standards such as RS-232, RS-425, Universal Serial Bus (USB), and the like.

Switch module 34 includes the electronic circuitry necessary to route a base video signal received on a camera interface 38 to monitor card 22 for character overlay processing and to route the composite video/character signal to a monitor 16 as controlled by CPU 24. Camera interface 38 includes the electronic circuitry necessary to receive a video signal from a camera 14 coupled to camera interface 38 (not shown). Similarly, monitor interface 36 includes the electronic circuitry necessary to transmit a composite video/character signal to a monitor 16 coupled to monitor interface 36 (not shown). It is presumed that one of ordinary skill in the art can design suitable interfaces 36 and 38.

CPU 24 is any central processing unit suitable for performing the functions described herein and can be a micro-controller, Intel-based processor, RISC processor or the like. Menu flash 26 is a flash memory storage device which stores, among other things, programming menus, the programmatic micro-controller code for monitor cards 22 and font bit maps used by monitor cards 22 to generate the overlaid text. Although menu flash 26 is described as a flash memory, any suitable memory device can be used such as electrically erasable programmable read only memory (EEPROM) non-volatile random access memory (NVRAM), battery backed-up random access memory, read only memory (ROM), and the like. An exemplary arrangement of data stored in menu flash 26 is described below.

Code flash 30 is a flash memory storage device which stores the programmatic software operating code used to run main board 20 such as the operating code used by CPU 24. It can also be adapted to store operating code for other CPUs and micro-controllers included as part of system 10. Although code flash 26 is described as a flash memory, any suitable memory device can be used such as electrically erasable programmable read only memory (EEPROM) non-volatile random access memory (NVRAM), battery backed-up random access memory, read only memory (ROM), and the like.

Figure 3:
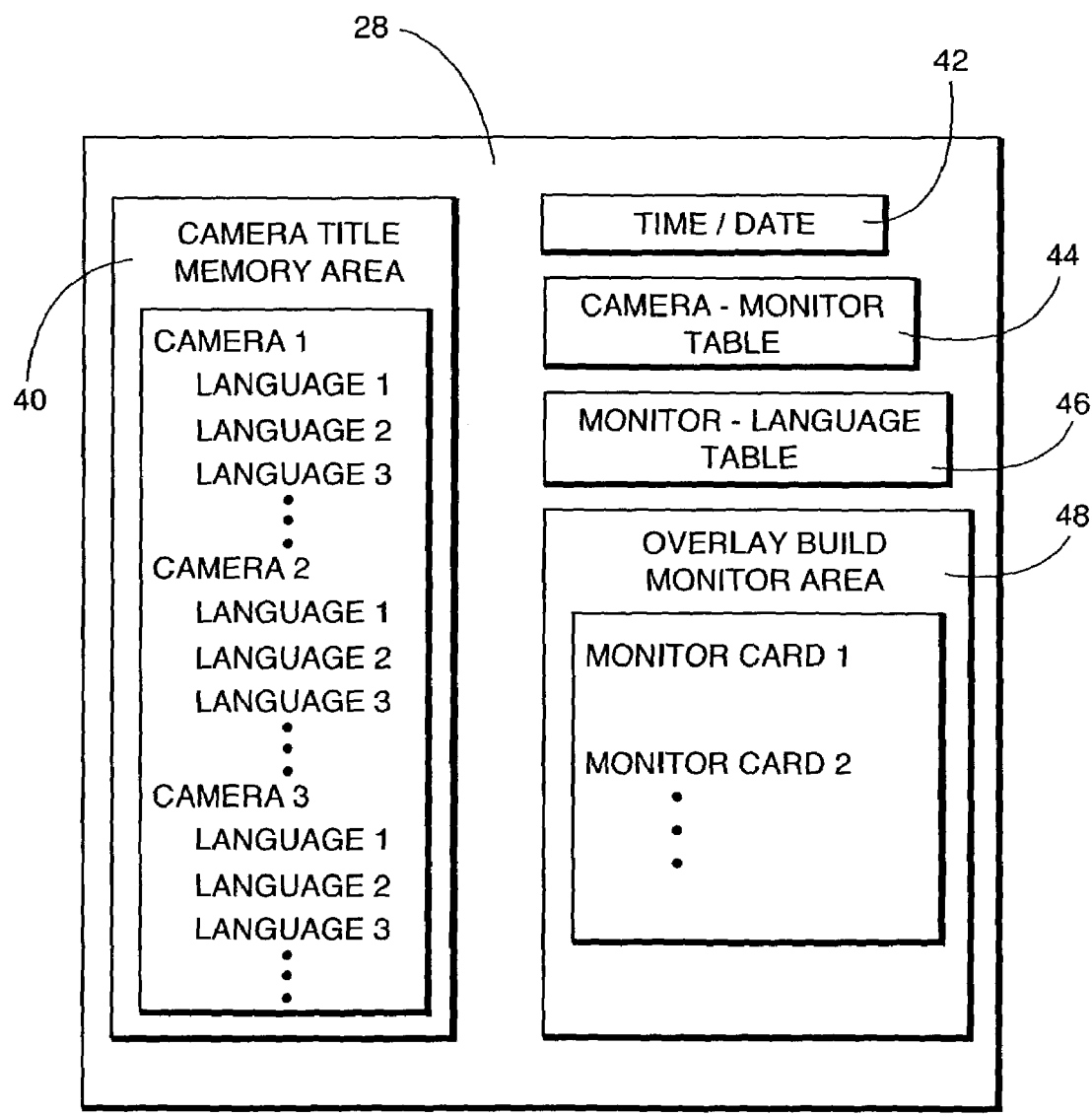
FIG. 3 is a block diagram of a system RAM data storage arrangement.

System RAM 28 is preferably a battery backed up RAM but is not limited to such. An exemplary storage arrangement for system RAM 28 is described with reference to FIG. 3. As shown in FIG. 3, system RAM 28 includes sufficient memory storage for general main board 20 operating functions, such as scratch pad memory (not shown), and also includes memory storage capacity to provide a camera title memory area 40, time/date memory area 42, camera-monitor table memory area 44, monitor-language table memory area 46 and overlay build memory area 48.

Camera title memory area 40 stores user defined titles (also referred to as labels) associated with cameras 14. The titles can be input by a user via keyboard 18 or predefined at the factory. Sufficient memory is provided to store the titles associated with each camera in multiple languages. As is shown in FIG. 3, camera title memory area 40 in this example includes storage of camera titles for three cameras in three different languages. Storage is programmatically arranged to store the title for each language at a predefined offset memory address from a base address for each camera. For example, English language titles may be stored at a zero byte offset from the base address for each camera, while Spanish titles may be stored at a 256 byte offset from the base address for each camera. In operation, when an operator requests camera one to be displayed on a monitor, CPU 24 reads the corresponding camera label from system RAM 28 to locate the camera label in the selected language for display on the monitor associated with camera one. This arrangement advantageously provides an efficient method for storing camera titles such that they can be quickly retrieved regardless of the selected language.

Time/date memory area 42 stores the current system time and date. Camera-monitor table memory area 44 stores mappings used by CPU 24 to instruct other components, such as switch module 34, as to which of monitors 16 is to display an image captured by a camera 14. In other words, camera-monitor table memory area 44 stores mappings between a video signal captured by a camera 14 and corresponding monitors 16 which display the video signal. Similarly, monitor-language table memory area 46 stores mappings between monitors 16 and the respective text languages displayed.

Overlay build memory area 48 includes sufficient memory such that the character overlay to be superimposed on a video signal by a monitor card 22 can be "built" in this area by one or more of CPU 24, monitor card 22 or other suitable component. In operation, the overlay text to be displayed is "built" in overlay memory build area 48, then transferred to memory in a corresponding monitor card 22. Monitor card 22 then uses the overlay build data to overlay the character with a video signal captured by a camera 14 to create the composite signal displayed on a monitor 16. For example, when generating a menu for display, menu data from menu flash 26 is copied to memory build area 48 for creation of the menu.

Figure 4:
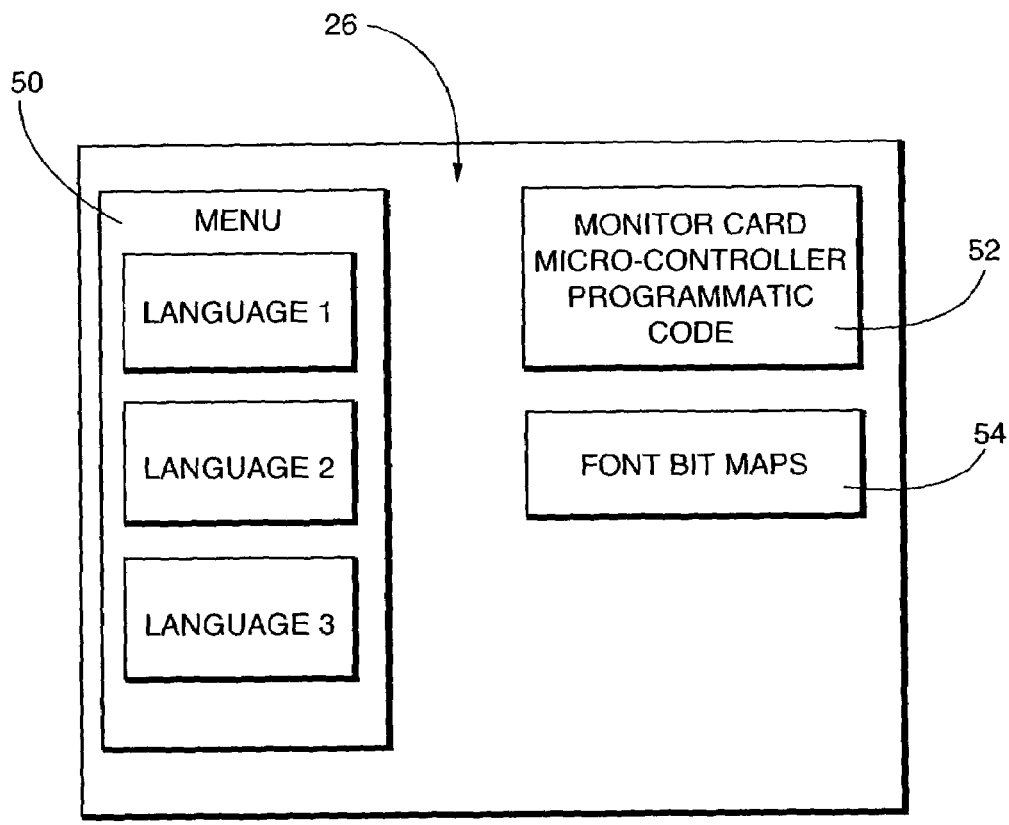
FIG. 4 is a block diagram of a menu flash data storage arrangement.

An exemplary storage arrangement for menu flash 26 described with reference to FIG. 4. As shown in FIG. 4, menu flash 26 includes menu data storage area 50, monitor card micro-controller programmatic code storage area 52 and a font bit map storage area 54. Menu data storage area 50 includes memory areas allocated for the storage of menus in one or more languages. As used herein, the term menu refers to the characters displayed so that an operator can configure and operate system 10. In operation, a menu is displayed as characters overlaid on a video signal on monitor 16. Also, although numerous references are made herein to overlaying characters on a video signal captured from a camera 14 to create a composite signal for display on monitor 16, the present invention is not limited to such. It is contemplated that overlaid characters may be presented on monitor 16 by overlaying the characters on a base video signal generated by a component within system 10, such as a "blue screen" background generated by monitor card 22. In this manner, an operator may observe and interact with menus on an easy to read screen arrangement, such as white characters on a blue background.

Menu area 50 is programmatically arranged to store the title for each language at a predefined offset memory value from a base address for each supported language. For example, English language menus, such as Language 1 in menu area 50, may be stored at a zero byte offset from the base reference address for each camera, while Spanish language menus, such as Language 2 in menu area 50, may be stored at a predetermined offset, e.g. a 256 byte offset, from the base address for each menu. A menu is comprised of one or more menu structures, which define the content and layout of the menu. By arranging the structure of each menu to be the same, the programmatic code uses the language offset value to create the menu in a format which is independent of the selected languages.

A menu structure includes data which instructs monitor card 22 as to what data to display and how to display the data. For example, a menu structure can include the characters or reference numbers, e.g. ASCII numbers, corresponding to the characters to be displayed for the particular language, and one or more of the color of the characters, the position of the text on the display, whether the characters should be blinking, bold, as well as pointers to the characters and previous items in the case where the particular menu element includes multiple choices. For example, a menu item which allows an operator to select a month might have 12 data structures which, when displayed, scroll through each of the 12 months (in the selected language) at a predetermined location on the display screen. The pointer to the next item refers to which memory location stores the structure for the next item to be displayed at that display position. For example, the next item in a month structure for the month "JAN" would point to the memory location for "FEB" and the previous item would point to the memory location for "DEC" for an English language menu. As such, when storing the menu structure data in menu flash 26, the structure is stored at the same position relative to the offset for each language.

In operation, when a menu is to be displayed on a monitor 16, the menu is read from menu flash 26 using an offset corresponding to the selected language. This arrangement advantageously provides an efficient method for storing menu data such that they can be quickly retrieved regardless of the selected language. This arrangement also simplifies system programming because, through the use of an offset value, a single program module can be used to accommodate multiple languages by referring to the memory location to retrieve a label or menu structure corresponding to a desired character or character string for a selected language based on a single offset variable value.

Monitor card micro-controller programmatic code storage area 52 stores the programmatic operating code used by the micro-controller in each monitor card 22. Font bit map storage area 54 stores bit map representations for fonts supported by system 10. For example, font bit map storage area 54 can be arranged to store a bit map for romance languages and bit maps for icon-based languages such as bit maps for traditional Chinese and simplified Chinese characters. On system boot up, the monitor card micro-controller code and one or more bit maps are loaded into memory in each monitor card 22 in system 10. Bit maps can also be loaded into monitor card memory "on the fly", as a particular language is selected which requires a bit map not currently loaded into the monitor card memory. Of course, all font bit maps can be loaded into monitor card 22 at system boot up provided there is sufficient memory in monitor card 22.

Figure 5:
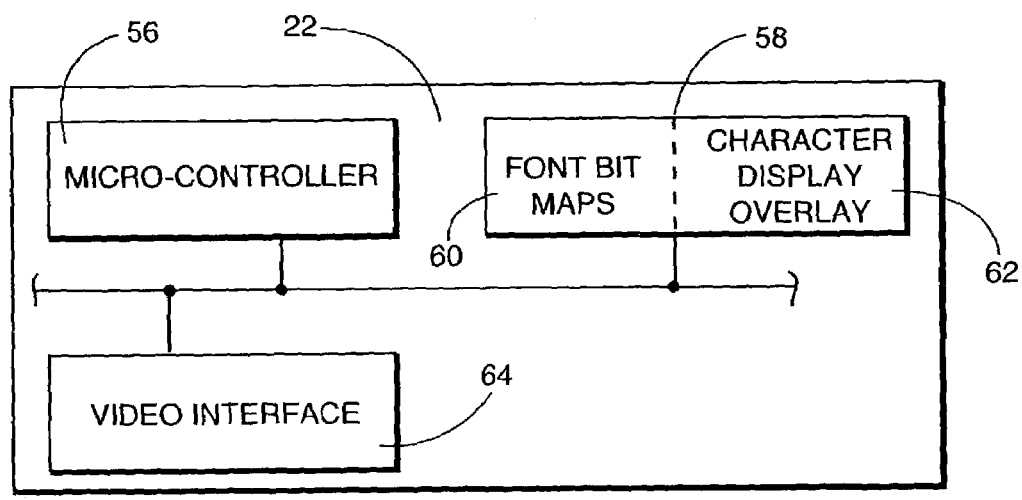
FIG. 5 is a block diagram of a monitor card.

An exemplary arrangement of monitor card 22 constructed in accordance with the principles of the present invention is described with reference to FIG. 5. Monitor card 22 includes micro-controller 56, RAM 58 and video interface 64, each of which are electrically coupled to one another via a data communication bus. Micro-controller 56 is any micro-controller or CPU capable of executing programmatic instructions for performing the functions described herein with respect to monitor card 22. For example, an embodiment of monitor card 22 uses a Field Programmable Gate Array (FPGA) such as an FPGA manufactured by the ALTERA Corporation. As discussed above, the programmatic operating code for micro-controller 56 is transferred from menu flash 26 to micro-controller 56 at system boot up.

RAM 58 is any RAM storage device, for example, static RAM (SRAM), dynamic RAM (DRAM), and the like, having a capacity sufficient to support the functions of monitor card 22. As shown in FIG. 5, RAM 58 is arranged to include storage areas for font bit maps 60 and character display overlay 62. As discussed above, font bit maps 60 are transferred from menu flash 26 to RAM 58. The character display overlay 62 is preferably assembled in system RAM 28 and transferred to RAM 58 for further processing by micro-controller into the composite signal displayed on monitor 16.

Video interface 64 includes suitable electronic communication hardware to receive a video signal from camera 16 via switch module 34 and to transmit the composite video/character signal to monitor 16 via switch module 34. It is presumed that one of ordinary skill in the art could design such interface hardware. In operation, micro-controller 56 uses font bit maps 60 and character display overlay 62 to create the composite video signal displayed on monitor 16. In the case where the characters are to be overlaid onto an image from camera 14, micro-controller 56 uses the video signal received by video interface 64 and superimposes font bitmap characters from font bit maps 60 corresponding to the overlay data in RAM 58 thereon. The resultant composite video signal is transmitted from video interface 64 to the selected monitor(s) 16. In the case there the text is to be overlaid onto a predetermined image, such as a "blue screen", micro-controller 56 superimposes bitmap characters corresponding to the overlay data in RAM 58 with the predetermined image. The resultant composite video signal is transmitted from video interface 64 to the selected monitor(s) 16.

For overlays created using simple font bit maps such as 255 character romance or Germanic language bit maps, character display overlay 62 includes reference index values, corresponding to the actual characters to be displayed. For example, the reference index may be based on the ASCII character set or be a reference to the Nth bit map in the font bit map set. During the composite video signal generation, micro-controller 56 looks up the corresponding bit map representations from font bit map 60 for superimposition with the base video signal. However, because a single font bit map set can be used for virtually all romance and Germanic languages, only a single font bit map is loaded into RAM 58. As noted above, the generation of character display overlay 62 takes into account the selected language based on the language offset value.

As with romance and Germanic languages, overlays created using more complex icon-based languages such as traditional and simplified Chinese, character display overlay 62 do not include the actual bit map character representation. However, because the font bit maps for icon-based languages are generally not interchangeable with each other, a language specific set is loaded into RAM 58 at boot up or when the language is selected, or at any other suitable programmatic point. This arrangement allows Character display overlay 62 includes reference values corresponding to the bit map for the character stored as part of font bit map 60 in RAM 58. In this case, micro-controller 56 assembles the composite video frame by operating to read the reference number in character display overlay 62, then obtaining the corresponding character bit map from font bit map 60. This arrangement advantageously minimizes the storage space needed for character display overlay 62 in RAM 58 as well as the storage space requirements of system RAM 28 and avoids unnecessarily overburdening CPU 24

FIG. 6 shows an exemplary arrangement of menu data displayed on monitor 16. FIG. 6 is arranged to have a 26 row by 32 column textual display area grid in which the rows are numbered 0-25 and the columns are numbered 0-31. Although the grid itself is not displayed on monitor 16, the placement of characters on monitor 16 is based on this grid.

Accordingly, the characters in character display overlay 62 are arranged in this grid. Structure data for the assembly of this menu is stored in menu flash 26. For example, the character "M" at row 2, column 11 in FIG. 6 is created at a corresponding grid location in system RAM 28 based on the menu structure data stored in menu flash 26 and transferred to RAM 58 for display on monitor 16. Although FIG. 6 as well as other drawing figures herein depict the present invention using a 26 row by 32 column grid, the invention is not limited to such. It is contemplated that any suitable grid granularity can be used depending on the system requirements, capacities of system RAM 28 and monitor card RAM 58, etc. As such a grid having more or fewer than 26 rows and/or 32 columns can be used.

FIG. 6 shows an exemplary display screen for monitor 16 used to configure monitor parameters. As shown in FIG. 6, a monitor menu, typically selectable from a main system menu screen (not shown), allows the operator to configure various parameters associated with a particular monitor. For example, an operator can configure the system to display one or more of the camera number, titles, receive/transmit type (R/X type), monitor/alarm number, monitor/alarm status, time and/or date. Further, the brightness level of the monitor can be set. Access to the language selection menu, described below, is also selectable from the monitor menu. In the case of FIG. 6, the menu is displayed in English. If the operator had previously selected a different menu language, the menu shown in FIG. 6 would be created in system RAM 28 using a memory location offset to call the menu data structure elements for the selected language.

FIG. 7 shows an example display on monitor 16 based on the language data stored in menu flash 26. As with FIG. 6, the grid shown in FIG. 7 is not actually displayed on monitor 16, but is included in FIG. 7 to aid understanding of the invention. The menu display shown in FIG. 7 is called by selecting the "Language Selection" menu element in FIG. 6. Language selection in the present invention is not limited to a dedicated language selection menu such as the menu shown in FIG. 7. It is contemplated that FIG. 6 or any other menu within system 10 can be arranged to facilitate language selection by, for example, a scrolling, pull down or other suitable selection list.

The menu shown in FIG. 7 provides the monitor identification number to which the menu parameters and selections apply, notes the menu language (English in this case), and identifies whether the supported languages are enabled (on) or disabled (off). Changing the menu language changes the menu offset value, thereby causing the language used for menu display to change to the selected language in the manner described above. The operator makes the appropriate selections using keyboard controller 18 and a suitable selection method such as via a graphical user interface, scrolling a highlighting character to effect a desired selection, etc. As shown in FIG. 7, the operator has enabled English and Spanish and disabled Portuguese, German and French. As such, characters displayed on monitor 16 corresponding to "Monitor 08" will be displayed in English and Spanish.

Other displays are also presented to the operator which allow further system configuration relating to language display. Referring to FIG. 8, monitor 16 also displays a camera configuration screen which allows an operator to configure camera related parameters, including providing access to camera title configuration options. An example camera configuration screen displayed on monitor 16 is shown in FIG. 8. As with FIGS. 6 and 7, the grid shown in FIG. 8 is not actually displayed on monitor 16, but is included in FIG. 8 to aid understanding of the invention. The camera configuration screen in FIG. 8 allows an operator to enable or disable vertical drive, define how the camera is controlled, and set a port address for the camera. The camera configuration screen also provides access to a camera title display screen which is used, among other things, to enable or disable camera titles and/or set the language of the titles stored in camera title memory area 40 in system RAM 28 as described. When system 10 is operating to display an image captured by a camera 14 on a monitor 16, these titles are overlaid by monitor card 22 with the video signal captured by camera 14 and displayed on one or more monitors 16.

As shown in FIG. 8, the camera title for the English language appears in grid row 11, columns 8-26 (shown as letters "X"), while the camera titles for the Spanish and French languages appear in grid row 12, columns 8-26 (shown as letters "Y"), and, grid row 13, columns 8-26 (shown as letters "Z"), respectively. An operator can set, edit or delete a title via keyboard controller 18.

As discussed above, a single monitor can support and display multiple languages simultaneously. An example of a display shown on monitor 16 which includes Spanish and English text for superimposition on the video signal is shown in FIG. 9. As with FIGS. 6-8, the grid shown in FIG. 9 is not actually displayed on monitor 16, but is included in FIG. 9 to aid understanding of the invention. The text area in FIG. 9 shows "PUERTO 1" as the Spanish language component and "DOOR 1" as the corresponding English language component along with the date and time in English. Recall that these two languages were shown as enabled in the menu shown and described with respect to FIG. 7. Although not shown, it is contemplated that the date and time could also be displayed in Spanish. Additional languages, if enabled are also displayed. As such, in this example, the title "PUERTO 1" corresponds with the title in the letter "Y" area in FIG. 8 while the title "DOOR" corresponds with the title in the letter "X" area in FIG. 8, each of which are stored in system RAM 28. The "0001" in row 23 refers to the camera number whose captured video image is being displayed and the "0001" in row 24 refers to the monitor number.

Although FIG. 9 shows two languages being displayed simultaneously on a single monitor 16, it is contemplated that system 10 is operable with a single language being displayed on a monitor 16. Referring to FIG. 1, monitor 16*a*, identified by the "0001" in the lower left corner, shows a composite image using English language text while monitor 16*b*, identified by the "0008" in the lower left corner, shows the same video image in which the composite image uses Spanish language text. Both of monitors 16*a* and 16*b* are displaying the date in the selected language and each identify camera "0001" on the top left hand row as the camera 14 whose image is being displayed.

The arrangement of the present invention advantageously supports complex languages which are typically difficult to support on monitors such as Chinese and Japanese. In accordance with the present invention, for these complex languages, it is only necessary to change the character font on a monitor-by-monitor basis. In addition, it is contemplated that the present invention can support two versions of Chinese, namely a simplified version and the traditional version of Chinese. Each monitor will allow the traditional or simplified version of Chinese to be selected. When the font is loaded to the monitor, the characters for the appropriate version of Chinese are displayed based on the font bit map loaded and stored in RAM 58. The simplified and traditional fonts are stored in menu flash 26 and copied to RAM 58 in monitor card 22 when system 10 is booted. Providing a sufficiently large RAM 58 in each monitor card 14 allows support of a mixture of Chinese and European languages.

Of note, although above description refers to the overlaid characters as "text", the present invention is not limited to traditional alpha-numeric text. As used herein, the terms "text" and "character" refer to any character or other graphic symbol capable of being stored as a bitmap for display on a monitor.

The present invention provides a system which allows multiple languages to be simultaneously displayed on the same or different monitors and does so by employing efficient programmatic code using memory storage offset values so that a programmer need not duplicate or customize the programmatic code to accomplish the multiple language display. In other words, the system and method of the present invention generate the multiple simultaneous languages in a manner which does not require that a portion of the code be duplicated to support each separate language. Further, the arrangement of the present invention facilitates the support of a mixture of character based languages such as romance and Germanic languages as well as complex icon-based languages such as Chinese and Japanese.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system providing simultaneous display of characters in multiple languages, the system comprising a main unit having a first memory, the first memory including menu structures for storing character data in a plurality of languages in which menu structures for character data in a first language correspond to menu structures for character data in each other language, the menu structures for the character data in each language being established in the first memory at memory locations having pre-defined offsets from a base address, a second memory storing at least one font bit map corresponding to characters of each language, and at least one monitor card electrically coupled to the first and second memories, each monitor card comprising a micro-controller executing programmatic code to generate overlay information for overlaying video data to be displayed on a monitor with the character data.

2. The system according to claim 1, wherein the character data is menu data.

3. The system according to claim 1, wherein the character data is camera label data.

4. A system providing simultaneous display of characters in multiple languages, the system comprising a main unit having a first memory, the first memory including character data stored in a plurality of languages in which a portion of the character data in a first language corresponds to another portion of the character data in a second language, the portion of the character data in the first language and the portion of the character data in the second language being stored in the first memory at memory locations having an offset value from each other, at least one monitor card electrically coupled to the first memory, each monitor card including: a micro-controller; and a second memory electrically coupled to the micro-controller, the second memory storing at least one font bit map corresponding to characters for the first language and characters for the second language and the second memory providing a memory area for storage of character display overlay data; the micro-controller executing programmatic code to generate a composite video signal comprised of a base video signal overlaid with characters from the font bit map, the character display overlay data including reference values corresponding to characters stored as part of the font bit map, the micro-controller substituting the character bit map corresponding to the reference value when generating the composite video signal.

5. The system according to claim 4, wherein the first memory is a system RAM memory having an overlay build memory area for each monitor card, the system further comprising a CPU electrically coupled to the monitor card and the first memory, the CPU executing programmatic code to build the character display overlay in the system RAM memory for subsequent transfer to the second memory.

6. The system according to claim 5, further comprising a display monitor electrically coupled to the main unit, wherein: the character data is camera label data; the system RAM memory further stores a monitor-language table associating a monitor with one or more of the first language and second language to be displayed on the monitor; and the CPU further executes programmatic code to: evaluate the monitor-language table to determine the language to be displayed on the monitor; determine the offset value based on the language to be displayed on the monitor; read the portion of the system RAM memory using the determined offset value which stores the camera label data corresponding to the language to be displayed on the monitor; and store the contents of the system RAM memory read using the determined offset value in the overlay build memory area corresponding to the monitor.

7. The system according to claim 5, wherein the main unit further includes a third memory electrically coupled to the first memory, the third memory storing menu structure data stored in a plurality of languages in which a portion of the menu structure data in the first language corresponds to another portion of the menu structure data in the second language, the portion of the menu structure data in the first language and the portion of the menu structure data in the second language being stored in the third memory at memory locations having an offset value from each other.

8. The system according to claim 7, wherein the third memory is a flash memory.

9. The system according to claim 7, further comprising a display monitor electrically coupled to the main unit, wherein: the system RAM memory further stores a monitor-language table associating a monitor with one or more of the first language and second language to be displayed on the monitor; and the CPU further executes programmatic code to: evaluate the monitor-language table to determine the language to be displayed on the monitor; determine the offset value based on the language to be displayed on the monitor; read the portion of the third memory using the determined offset value which stores the menu structure data corresponding to the language to be displayed on the monitor; store the contents of the third memory read using the determined offset value in the overlay build memory area corresponding to the monitor.

10. The system according to claim 9, wherein the third memory is arranged to further store the font bit maps and the programmatic code executable by the micro-controller, the font bit maps corresponding to the first language and the second language being transferred from the third memory to the second memory at system boot up.

11. The system according to claim 1, wherein the first language is an icon based language.

12. The system according to claim 11, wherein the icon based language is one of simplified Chinese and traditional Chinese.

13. A system providing simultaneous display of characters in multiple languages, the system comprising a main unit having a first memory, the first memory including character data stored in a plurality of languages in which a portion of the character data in a first language corresponds to another portion of the character data in a second language, the portion of the character data in the first language and the portion of the character data in the second language being stored in the first memory at memory locations having an offset value from each other, at least one monitor card electrically coupled to the first memory, each monitor card including: a micro-controller; and a second memory electrically coupled to the micro-controller, the second memory storing at least one icon language-based font bit map corresponding to characters for the first language and characters for the second language, the second memory providing a memory area for storage of character display overlay data; the micro-controller executing programmatic code to generate a composite video signal comprised of a base video signal overlaid with characters from the icon language-based font bit map, the character display overlay data including reference values corresponding to characters stored as part of the font bit map, the micro-controller substituting the character bit map corresponding to the reference value when generating the composite video signal.

14. A closed circuit television video matrix switch providing simultaneous display of characters in multiple languages on one or more monitors electrically coupled thereto, the switch comprising a first memory, the first memory including menu structures for storing character data in a plurality of languages m which menu structures for character data in a first language correspond to menu structures for character data in each other language, the menu structures for the character data in each language being established in the first memory at memory locations having pre-defined offsets from a base address.

15. A closed circuit television video matrix switch providing simultaneous display of characters in multiple languages on one or more monitors electrically coupled thereto, the switch comprising a first memory, the first memory including character data stored in a plurality of languages in which a portion of the character data in a first language corresponds to another portion of the character data in a second language, the portion of the character data in the first language and the portion of the character data in the second language being stored in the first memory at memory locations having an offset value from each other, wherein the first language is an icon-based language, the video matrix switch further comprising at least one monitor card electrically coupled to the first memory, each monitor card including: a micro-controller; and a second memory electrically coupled to the micro-controller, the second memory storing at least one of a font bit map corresponding to characters for the first language and another font bit map corresponding to characters for the second language, and the second memory providing a memory area for storage of character display overlay data; the micro-controller executing programmatic code to generate a composite video signal comprised of a base video signal overlaid with characters from the font bit map, the character display overlay data including reference values corresponding a character stored as part of the font bit map, the micro-controller substituting the character bit map corresponding to the reference value when generating the composite video signal.

16. The video matrix switch according to claim 15, further comprising: a monitor interface; a camera interface; and a switch module, the switch module being electrically coupled to the monitor interface and the camera interface and routing a base video signal received from the camera interface to the monitor card for character overlay processing to create the composite video signal, the switch module further routing the composite video signal to the monitor interface for display on the monitor.

17. A method for providing simultaneous display of characters in multiple languages, the method comprising: determining a memory storage location offset value; storing character data for a plurality of languages in menu structures in a first memory, such that the character data of each language is stored in corresponding menu structures for each language, said corresponding menu structures being established in the first memory at memory locations based on the offset value; storing a font bit map corresponding to characters for said plurality of languages in a second memory; and generating overlay information for overlaying video data to be displayed on a monitor with the character data via a micro-controller on a monitor card.

18. The method according to claim 17, wherein the character data is menu data.

19. The method according to claim 17, wherein the character data is camera label data.

20. A method for providing simultaneous display of characters in multiple language, the method comprising: determining a memory storage location offset value; storing character data for a plurality of languages in menu structures in a first memory, such that the character data of each language is stored in corresponding menu structures for each language, said corresponding menu structures being established in the first memory at memory locations based on the offset value; storing at least one font bit map corresponding to characters for a first language and characters for a second language; generating character overlay display data in at least one of the first language and the second language based on the stored at least one font bit map; generating a composite video signal comprised of a base video signal overlaid with the character display overlay data.

21. The method according to claim 20, wherein the first memory is a system RAM memory having an overlay build memory area for at least one monitor card, the method further comprising building the character display overlay in the system RAM memory.

22. The method according to claim 21, further comprising: storing a monitor-language table associating a monitor with one or more of the first language and second language to be displayed on the monitor; evaluating the monitor-language table to determine the language to be displayed on the monitor; and determining the offset value based on the language to be displayed on the monitor; reading the portion of the system RAM memory using the determined offset value which stores camera label data corresponding to the language to be displayed on the monitor; and storing the contents of the system RAM memory read using the determined offset value in the overlay build memory area corresponding to the monitor.

23. The method according to claim 21, further comprising storing menu structure data in a plurality of languages in which a portion of the menu structure data in the first language corresponds to another portion of the menu structure data in the second language, the portion of the menu structure data in the first language and the portion of the menu structure data in the second language being stored at memory locations having an offset value from each other.

24. The method according to claim 23, further comprising: storing a monitor-language table associating a monitor with one or more of the first language and second language to be displayed on the monitor; evaluating the monitor-language table to determine the language to be displayed on the monitor; determining the offset value based on the language to be displayed on the monitor; reading the portion of the memory using the determined offset value which stores the menu structure data corresponding to the language to be displayed on the monitor; and storing the contents of the memory read using the determined offset value in the overlay build memory area corresponding to the monitor.

25. The method according to claim 24, further comprising: storing the font bit maps and the programmatic code executable by the micro-controller in a non-volatile memory; and transferring the font bit maps corresponding to the first language and the second language from the non-volatile memory to a memory in a monitor card.

26. The method according to claim 17, wherein the first language is an icon based language.

27. The method according to claim 26, wherein the icon based language is one of simplified Chinese and traditional Chinese.

28. A method for providing simultaneous display of characters in multiple language, the method comprising: determining a memory storage location offset value; storing character data for a plurality of languages in menu structures in a first memory, such that the character data of each language is stored in corresponding menu structures for each language, said corresponding menu structures being established in the first memory at memory locations based on the offset value; storing at least one font bit map corresponding to characters for the first language and characters for the second language, wherein the first language is an icon based language; providing a memory area for storage of character display overlay data; generating a composite video signal comprised of a base video signal overlaid with characters from the font bit map, the character display overlay data including reference values corresponding to a character stored as part of the font bit map; and substituting the character bit map corresponding to the reference value when generating the composite video signal.

29. A closed circuit television monitoring system for displaying characters overlaid on a base video image, the displayed characters being in one or more of a plurality of languages, the system comprising: a plurality of displays; at least one camera, each camera capturing the base video image; a switch electrically coupled to the plurality of displays and at least one camera, the switch comprising: a first memory, the first memory including character data stored in a plurality of languages in which a portion of the character data in a first language corresponds to another portion of the character data in a second language, the portion of the character data in the first language and the portion of the character data in the second language being stored in the first memory at memory locations having an offset value from each other; a second memory electrically coupled to the first memory, the second memory being a random access memory and including an overlay build memory area, the overlay build memory area storing character overlay data for a corresponding display in a selected one of the first language and the second language; and a monitor card electrically coupled to the first memory and the second memory, the monitor card including a micro-controller and a third memory, the third memory arranged to store at least one font bit map corresponding to characters for the first language, characters for the second language, and character overlay data copied from the second memory, the micro-controller generating a composite video signal for display on one or more selected displays, the composite video signal including the base video signal and an overlay based on the character overlay data and on a font bit map corresponding to the selected language.

30. The system according to claim 29, wherein the character overlay data stored in the third memory includes reference values corresponding to a portion of the font bit map.

31. The system according to claim 30, wherein one of the first language and the second language is an icon-based language.

32. A system providing simultaneous display of characters in multiple languages, comprising: a first memory, said first memory further comprising character data in a plurality of languages; a second memory, said second memory further comprising at least one font bit map corresponding to characters for a first language and characters for a second language, and a memory area for storage of character display overlay data; and a micro-controller; wherein said system generates a composite video signal comprised of a base video signal overlaid with characters from the font bit map, the character display overlay data including reference values corresponding to characters stored as part of the font bit map, the micro-controller substituting the character bit map corresponding to the reference value when generating the composite video signal.

33. The system according to claim 32, wherein one of the languages is an icon-based language.

34. A method for providing simultaneous display of characters in multiple languages, the method comprising: storing character data for a first language and a second language in a first memory; storing at least one font bit map corresponding to characters for a first language and characters for a second language in a second memory; generating a composite video signal comprised of a base video signal overlaid with characters from the font bit map, the character display overlay data including at least one reference value corresponding to at least one character stored as part of the font bit map; and substituting a character bit map corresponding to such reference value when generating the composite video signal.

35. The method according to claim 34, wherein one of the languages is an icon-based language.

36. A closed circuit television video matrix switch providing simultaneous display of characters in multiple languages on at least one monitor electrically coupled thereto, the switch comprising a first memory, the first memory including menu structures for storing character data in a plurality of languages in which menu structures for character data in a first language correspond to menu structures for character data in each other language, the menu structures for the character data in each language being established in the first memory at memory locations having pre-defined offsets from a base address, a second memory storing at least one font bit map corresponding to characters of each language, and at least one monitor card electrically coupled to the first and second memories, each monitor card comprising a micro-controller executing programmatic code to generate overlay information for overlaying video data to be displayed on a monitor with the character data.

* * * * *